(12) United States Patent
Day et al.

(10) Patent No.: US 6,961,820 B2
(45) Date of Patent: Nov. 1, 2005

(54) SYSTEM AND METHOD FOR IDENTIFYING AND ACCESSING STREAMING DATA IN A LOCKED PORTION OF A CACHE

(75) Inventors: Michael Norman Day, Round Rock, TX (US); Charles Ray Johns, Austin, TX (US); James Allan Kahle, Austin, TX (US); Peichun Peter Liu, Austin, TX (US); David J. Shippy, Austin, TX (US); Thuong Quang Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 10/366,440

(22) Filed: Feb. 12, 2003

(65) Prior Publication Data

US 2004/0162946 A1 Aug. 19, 2004

(51) Int. Cl.⁷ .............................................. G06F 12/00
(52) U.S. Cl. ..................................... 711/129; 711/118
(58) Field of Search ................. 711/118–122, 128–130, 711/133–134, 159–160

(56) References Cited

U.S. PATENT DOCUMENTS 6,122,708 A * 9/2000 Faraboschi et al. ......... 711/118
6,223,256 B1 * 4/2001 Gaither ....................... 711/134
6,243,791 B1 * 6/2001 Vondran, Jr. ................ 711/120
6,434,671 B2 * 8/2002 Chung ........................ 711/129
6,598,124 B1 * 7/2003 Damron et al. ............. 711/133
6,801,207 B1 * 10/2004 Tischler et al. ............. 345/557

* cited by examiner

Primary Examiner—Nasser Moazzami
(74) Attorney, Agent, or Firm—Carr LLP; Diana R. Gerhardt

(57) ABSTRACT

A system and method are provided for efficiently processing data with a cache in a computer system. The computer system has a processor, a cache and a system memory. The processor issues a data request for streaming data. The streaming data has one or more small data portions. The system memory is in communication with the processor. The system memory has a specific area for storing the streaming data. The cache is coupled to the processor. The cache has a predefined area locked for the streaming data. A cache controller is coupled to the cache and is in communication with both the processor and the system memory to transmit at least one small data portion of the streaming data from the specific area of the system memory to the predefined area of the cache when the one small data portion is not found in the predefined area of the cache.

23 Claims, 4 Drawing Sheets

SYSTEM AND METHOD FOR IDENTIFYING AND ACCESSING STREAMING DATA IN A LOCKED PORTION OF A CACHE

BACKGROUND OF THE INVENTION

1. Field of the Invention

The invention relates generally to a memory management scheme and, more particularly, to using a cache memory with a locking feature to process streaming data more efficiently.

2. Description of the Related Art

In a large configuration computer system, there are several levels of a memory hierarchy, the lowest level being a system memory and higher levels being caches that hold frequently accessed data closer to the computing engine.

A level one (L1) cache is usually not shared by computing engines in a computer system. A level two (L2) cache is usually shared by computing engines in the system. Generally, caches keep data close to the computing engines, and the data stored in a cache will be re-used with a much better latency.

For streaming data applications, large volumes of data are pulled or pushed through the cache with very little re-use, if any. In prior art, least recently used algorithms are used to determine which data in the cache should be replaced by the new data. For streaming data, this results in data having high re-use in the cache being replaced by a large volume of streaming data having low re-use, thus minimizing the effectiveness of the cache in reducing the access latency of frequently used data. In this streaming situation, the cache is effectively "thrashed" (frequently replaced) by the streaming data, making the use of the cache inefficient.

A prior art approach for avoiding this behavior is to make the streaming data non-cacheable to prevent thrashing of the cache with low re-use streaming data. However, this has the negative side effect of significantly increasing the latency of the streaming data accesses, since cache pre-fetch and partial access mechanisms are disabled. On-chip cache to cache transfer of this data is also lost if caching of the data is inhibited.

Therefore, a need exists for a system and method for managing streaming data within a cache in a more efficient manner.

SUMMARY OF THE INVENTION

The present invention provides a system and method for efficiently processing data with a cache in a computer system. The computer system has a processor, a cache and a system memory. The processor issues a data request for streaming data. The streaming data has one or more small data portions. The system memory is in communication with the processor. The system memory has a specific area for storing the streaming data. The cache is coupled to the processor. The cache has a predefined area locked for the streaming data. A cache controller is coupled to the cache and is in communication with both the processor and the system memory to transmit at least one small data portion of the streaming data from the specific area of the system memory to the predefined area of the cache when the one small data portion is not found in the predefined area of the cache.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
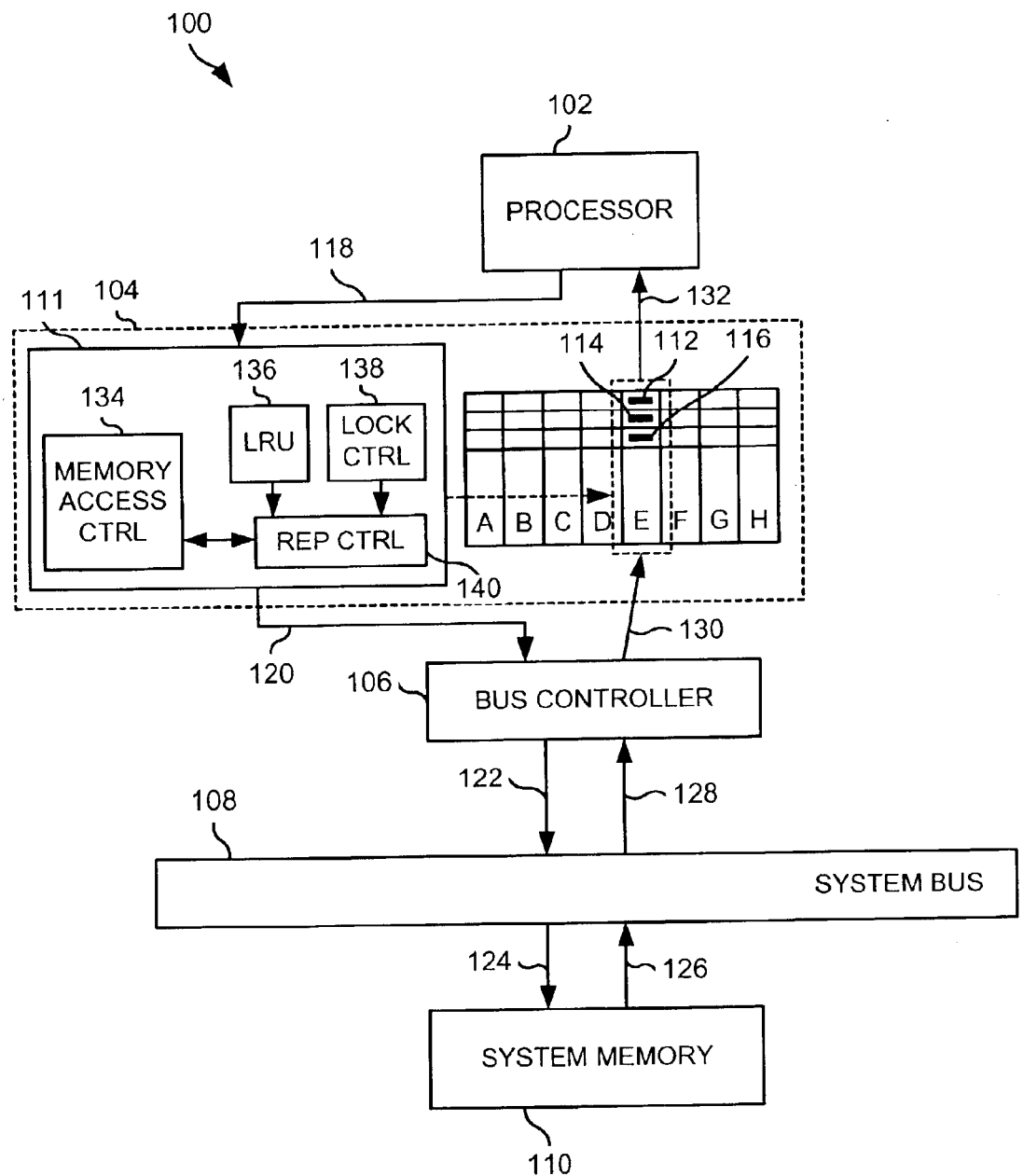
FIG. 1 is a block diagram illustrating a computer system using a locking cache to efficiently process streaming data.

Referring to FIG. 1 of the drawings, the reference numeral 100 generally designates a computer system using a locking cache to efficiently process streaming data. The computer system 100 comprises a processor 102, a cache 104, a bus controller 106, a system bus 108, and a system memory 110.

The processor 102 is coupled to the cache 104. The cache 104 is coupled to the bus controller 106. The system bus 108 is coupled to the bus controller 106. The system memory 110 is coupled to the system bus 108.

Generally, the cache 104 contains a plurality of cache sets. In this example, shown are eight cache sets A–H, of which the cache set E represents a selected cache set bound to one or more streaming data areas (not shown) in the system memory 110. For example, if the cache is 512 Kbytes, each cache set is 64 Kbytes. This specific example may well be generalized to a case, where one or more cache sets are selected for storing streaming data from a plurality of cache sets. The cache set E contains a plurality of cache lines including cache lines 112, 114 and 116. Similarly, other cache sets each contain a plurality of cache lines (not shown). For example, each cache line is 128 bytes. The cache further includes a cache controller 111.

The processor 102 makes a request for data. Preferably, the data takes the form of streaming data including but not limited to video and/or audio streaming data. Typically at an initial stage of a streaming operation, the data is not found in the cache 104 but in the system memory 110. Specifically, the processor 102 issues a data request for the data. The data request is sent to the cache controller 111 via a connection 118. If the data already exists in the cache 104, then the data is returned to the processor 102. If the data is "missed" in the cache 104 (for example, the data is stored in the system memory 110), then the cache controller 111 transmits the data request to the bus controller via a connection 120. In this case, the cache controller 111 has to determine which cache set(s) of the cache 104 will be used to store the requested data.

Preferably, the processor 102 knows what cache lines are locked for temporarily storing the data. In the present configuration, for example, the processor 102 knows that the cache lines 112, 114 and 116 are locked for this purpose. The cache 104 then transmits three requests (not shown) sequentially to the bus controller 106 via the connection 120. The three requests are for the three cache lines 112, 114 and 116. Generally, if there are N cache lines locked for temporarily storing the data, the cache 104 will be transmitting N requests sequentially to the bus controller 106 via the connection 120, where N is an integer equal to or greater than 1. The three requests are then transmitted from the bus controller 106 to the system bus 108 via the connection 122 in a sequential manner. Finally, the three requests are sequentially transmitted from the system bus 108 to the system memory 110 via the connection.

The bus controller 106 transmits the data request to the system bus 108 via a connection 122. The system bus 108 then transmits the data request to the system memory 110 via a connection 124.

In response to the data request, the system memory 110 transmits requested data back to the cache 104 over time. However, the system memory 110 does not transmit the entire requested data at one time. Rather, it transmits only a portion of the requested data to the processor 102 at a time and keeps transmitting one portion of the requested data at a time until the entire requested data is sent to the cache. Preferably, the system memory 110 divides the requested data into a plurality of smaller data equivalent to the size of a single cache line and then transmits each smaller data at a time to the cache 104. If the requests are sequentially transmitted from the cache 104 to the system memory 110, the system memory 110 responds to each individual request as it is received. Therefore, in the aforementioned preferred embodiment of sequentially transmitting a plurality of requests, the system memory 110, in response to the sequentially transmitted multiple requests, sequentially transmits to the system bus 108 a plurality of small data portions of the requested data via the connection 126. The system bus 108 sequentially transmits the small data portions to the bus controller 106. The bus controller 106 sequentially transmits the small data portions to each of the cache lines 112, 114 and 116 in the cache 104.

In a time period during which a small part (for example, a single cache line) of the requested data is sent from the system memory 110 to the cache 104, specific data transmission details are as follows. The system memory 110 transmits the small part of the requested data to the system bus 108 via a connection 126. The system bus 108 then transmits the small part of the requested data to the bus controller 106 via a connection 128. The bus controller 106 then transmits the small part of the requested data to the cache 104 via a connection 130. In the present example, only the cache set E is locked for temporarily storing the small part of the requested data. The small part of the requested data is therefore stored in the cache set E of the cache 104. If the computer system 100 is designed to divide the requested data into a plurality of small parts with each small part being of the size of a single cache line, the small part of the requested data will be stored in any of the cache lines 112, 114 and 116. Subsequently, the processor 102 accesses the cache 104 via a connection 132 to fetch the small part of the requested data and processes the small part of the requested data. The entire process repeats itself over time until all small parts of the requested data are sent to the processor 102 in this manner.

In a preferred embodiment, the cache controller 111 comprises a memory access control unit 134, a least-recently-used (LRU) unit 136, a lock control unit 138, and a replacement control unit 140. The memory access control unit 134, the LRU unit 136, and the lock control unit 138 independently process the data request from the processor 102. The memory access control unit 134 determines whether the requested data is stored in the cache 104 or not. For example, the memory access control unit 134 checks a directory (not shown) in the cache controller 111 to make the determination. If a data miss occurs, the memory access control unit 134 sends the data request to the bus controller 106 via the connection 120. In the meantime, the LRU unit 136 and the lock control unit 138 also process the data request. When the requested data is streaming data, the lock control unit 138 will determine which cache set(s) will store the requested data returned from the system memory 110. Otherwise, the LRU unit 136 will make the determination. In the present example, the lock control unit 138 determines that the cache set E will store the requested data returned from the system memory 110. This information is then provided to the replacement control unit 140, which controls the cache set E for this purpose.

Preferably, an application program that requires the requested data to be processed determines location and size of the data-streaming region in the system memory 110 and a single selected cache set and/or the number of the selected cache sets to be "locked" and bound to that area. Therefore, no matter how large the requested data, the requested data will be temporarily stored in one or more predefined cache sets only and will not pollute other sets of the cache 104.

In a preferred embodiment of the present invention, binding an area of the system memory 110 to one or more "locked" cache set(s) is done for processor load and store operations by loading hardware range registers (not shown). Such hardware range registers define a starting system memory address, a length and an associated cache-lock index. For streaming Direct Memory Access (DMA) operations, a cache-lock index to use with the operation is specified in a DMA command. The hardware utilizes the cache-lock index to access a cache management table (not shown) that software has previously loaded to indicate which cache sets are to be used for each cache locked area. For example, each bit in the table represents a 64 K byte cache set. If the bit is set, the set is locked to that index. If the bit is not set, the set is not locked to the index. A set can be locked to more than one index.

Streaming data generally tends to be large in size. However, the processor 102 does not have to process all of the streaming data at one time. Rather, the processor 102 typically processes a small portion of the streaming data during a short period of time and moves on to another portion during another short period of time and so on.

In a preferred embodiment of the present invention, a streaming data area (not shown) of the system memory 110 is preferably defined by an address and size and may be used for storing streaming data. The streaming data area of the system memory 110 is bound to one or more "locked" sets (for example, the cache set E) in the cache 104. When the processor 102 issues a request for data from the streaming data area of system memory 110, if the requested data is not found in the locked set(s) (for example, the cache set E) of the cache 114, one or more cache lines (for example, the cache lines 112, 114 and/or 116) within the locked set(s) (for example, the cache set E) are loaded with the requested data using a standard least-recently-used replacement algorithm. In this manner, the requested streaming data will be loaded into only the locked set(s) (for example, the cache set E) of the cache 104.

When the processor 102 issues a request for data that is neither found in the cache 104 nor within the aforementioned streaming data area of the system memory 110, the requested data will be loaded into an area of the cache 104 not corresponding to the locked set (for example, the cache set E). In this manner, the requested non-streaming data will be loaded into cache set(s) (for example, any of the cache sets A–D and F–H) other than the locked set(s) (for example, the cache set E).

In one embodiment of the present invention, a plurality of such streaming data areas may be bound to different locked set(s) in the cache 104. In an alternative embodiment, a plurality of such streaming data areas may be bound to the same locked set(s) in the cache 104.

The computer system 100 may be generalized to a computer system having a plurality of processors. In that case, an additional cache (not shown) and an additional bus controller (not shown) may be coupled between each additional processor (not shown) and the system bus 108 in a manner similar to the connection between the processor 102 and the system bus 108.

In a preferred embodiment of the present invention, multiple streaming data areas in the system memory 110 can be bound to different locked set(s) in the cache 104. In an alternative embodiment, multiple streaming data areas in the system memory 110 can be bound to the same locked set(s) in the cache 104.

Figure 2:
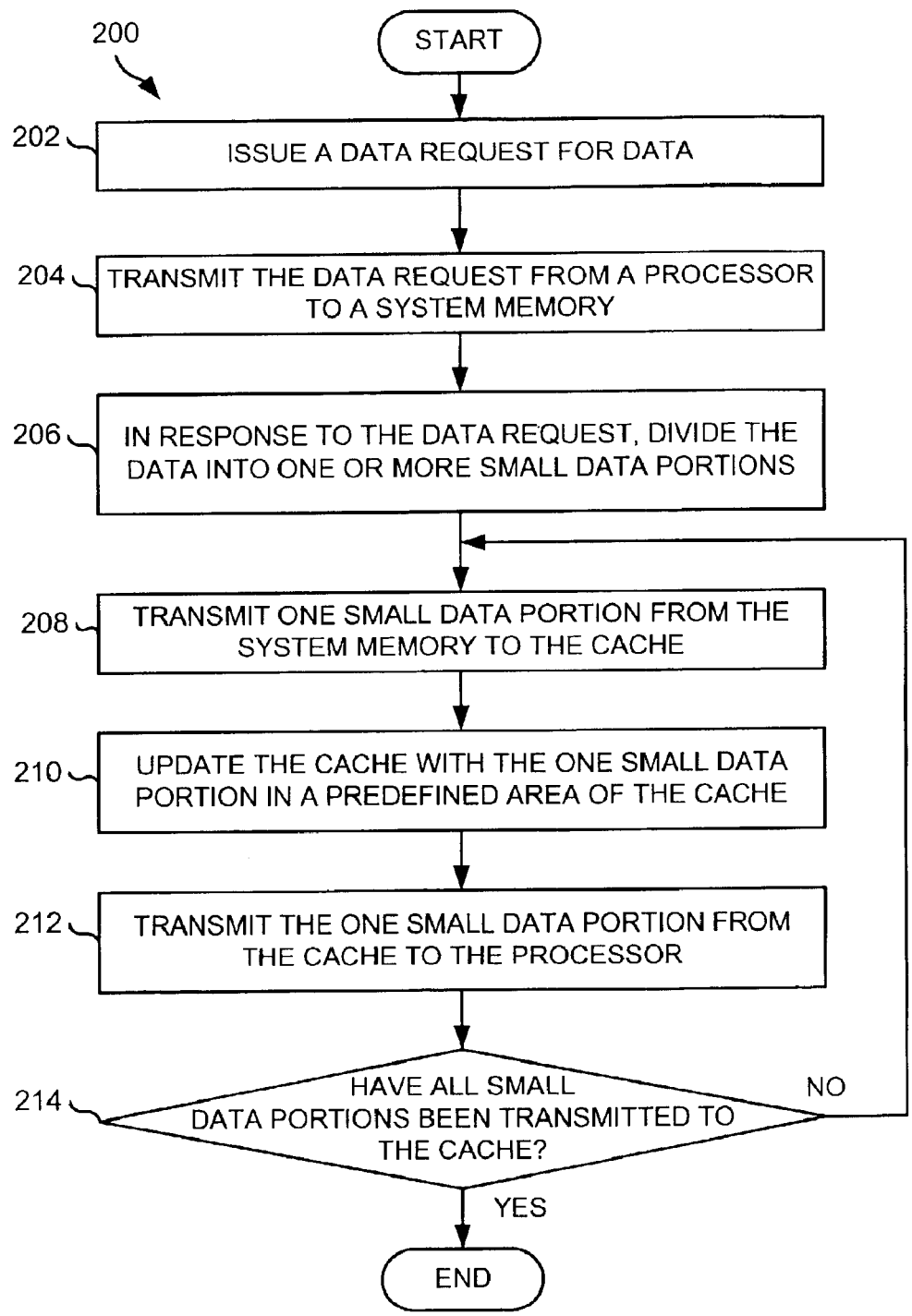
FIG. 2 is a flow diagram illustrating the operation of the computer system of FIG. 1.

In FIG. 2, a flow diagram 200 is shown to illustrate the operation of the computer system 100 of FIG. 1. In step 202, the processor 102 issues a data request for data. Preferably, the data takes the form of streaming data including but not limited to video and/or audio streaming data.

In step 204, the data request is transmitted from the processor 102 to the system memory 110. Preferably, the data request is transmitted from the processor 102 to the cache 104 to the bus controller 106 to the system bus 108 to the system memory 110.

In step 206, in response to the data request, the data is divided into one or more small data portions. Here, each data portion is to be stored in a predefined area of the cache 104. Typically, the predefined area comprises one or more cache sets. In the computer system 100 of FIG. 1, the predefined area will be the cache set E.

In step 208, one small data portion is transmitted from the system memory 110 to the cache 104. Preferably, the one small data portion is transmitted from the system memory 110 to the system bus 108 to the bus controller 106 to the cache 104.

In step 210, the cache 104 is updated with the one small data portion in the predefined area of the cache 104. Preferably, the predefined area of the cache 104 includes one or more cache sets.

In step 212, the one small data portion is transmitted from the cache 104 to the processor 102. Preferably, the processor 102 accesses the predefined area of the cache 104 to retrieve the one small data portion stored therein.

In step 214, it is determined whether all small data portions have been transmitted to the cache 104. If not, the data has not been transmitted to the cache completely. In this case, the flow diagram 200 continues in step 208 to transmit another small data portion. If it is determined in step 214 that all small data portions have been transmitted to the cache 104, then the flow diagram 200 ends.

Figure 3:
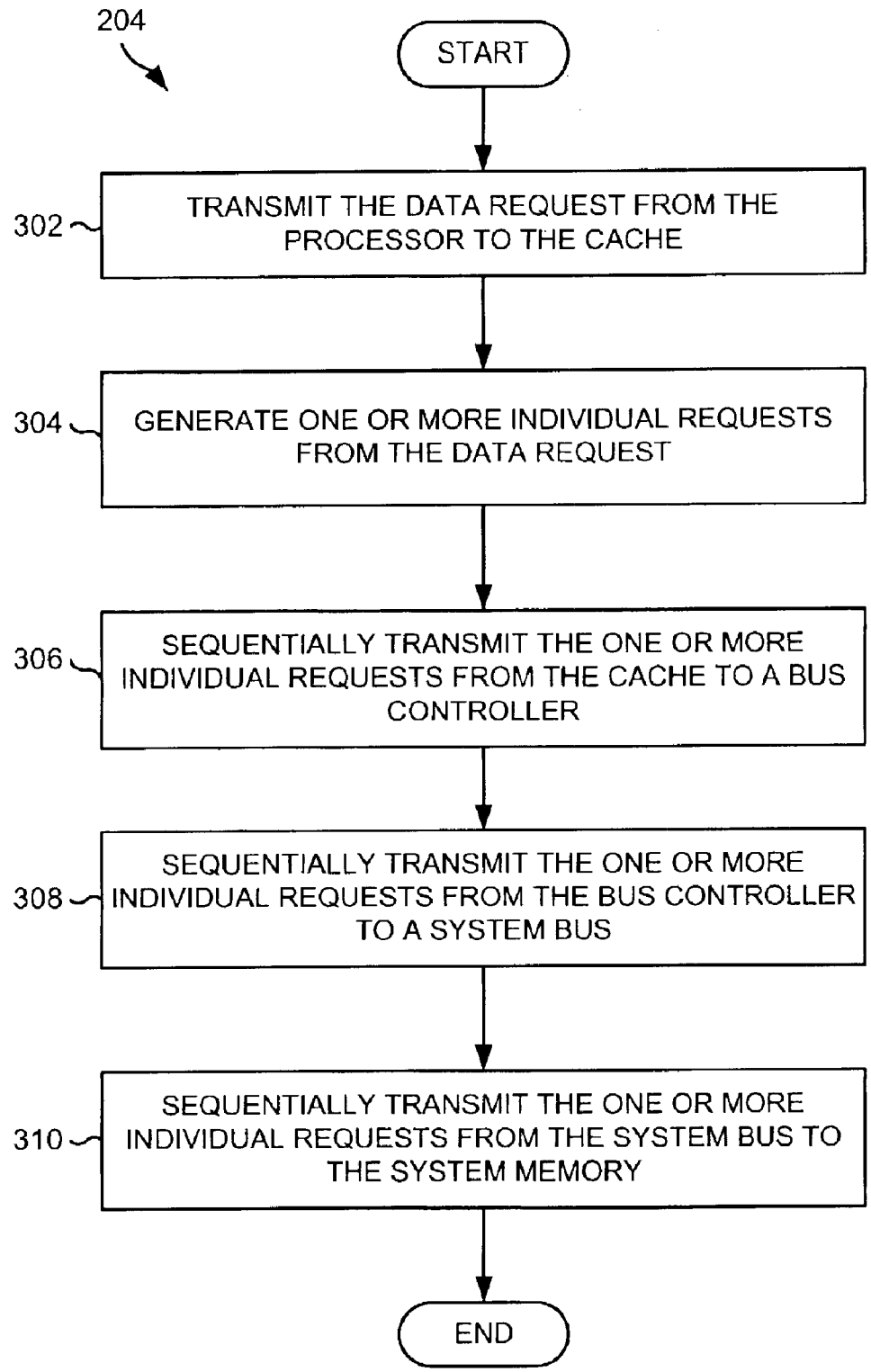
FIG. 3 is a flow diagram illustrating a preferred embodiment of the step of transmitting a data request as shown in FIG. 2.

Now referring to FIG. 3, a flow diagram 300 illustrates a preferred embodiment of step 204 as shown in FIG. 2. In step 302, the data request is transmitted from the processor 102 to the cache 104. Preferably, the data request is transmitted in its entirety from the processor 102 to the cache 104 in step 302.

In step 304, one or more individual requests are generated from the data request. Here, each individual request corresponds to a single cache line. In other words, each individual request is defined to be a request for data to be stored in a single cache line. For example, in the specific configuration shown in FIG. 1, there will be at least three individual requests for the cache lines 112, 114 and 116, and each of the three individual requests is a request for data to be stored in each of the cache lines 112, 114 and 116.

In step 306, the one or more individual requests are sequentially transmitted from the cache 104 to the bus controller 106. Similarly, in step 308, the one or more individual requests are sequentially transmitted from the bus controller 106 to the system bus 108. In step 310, the one or more individual requests are sequentially transmitted from the system bus 108 to the system memory 110.

Figure 4:
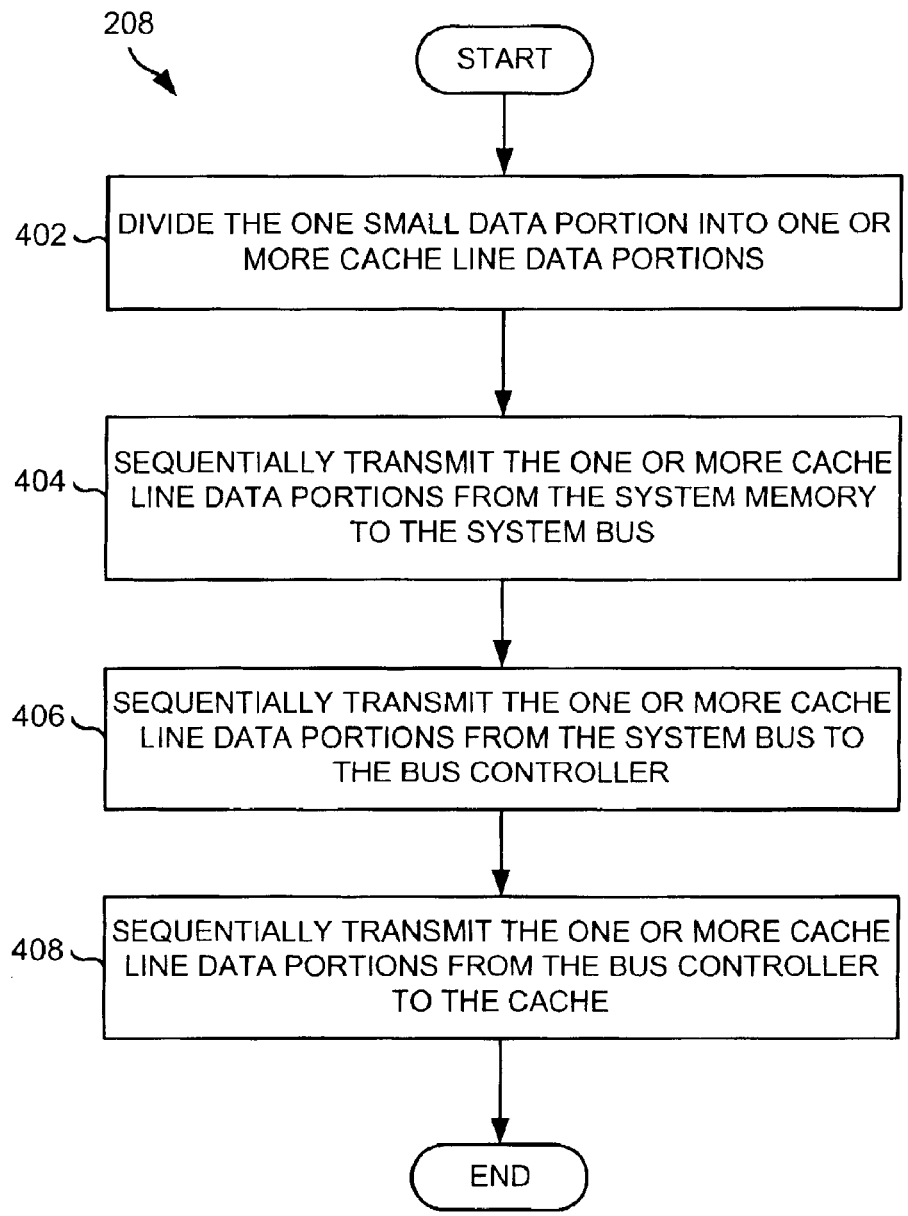
FIG. 4 is a flow diagram illustrating a preferred embodiment of the step of transmitting a small data portion as shown in FIG. 2.

In FIG. 4, a flow diagram 400 illustrates a preferred embodiment of step 208 as shown in FIG. 2. In step 402, the one small data portion is divided into one or more cache line data portions. Here, each cache line data portion is responsive to a corresponding individual request. In other words, each cache line data portion is to be stored in each cache line. For example, in the specific configuration of FIG. 1, there will be at least three cache line data portions to be stored in the cache lines 112, 114 and 116, respectively.

In step 404, the one or more cache line data portions are sequentially transmitted from the system memory 110 to the system bus 108. In the aforementioned example, the cache line portion to be stored in the cache line 112 will first be transmitted to the system bus 108. Subsequently, the cache line portion to be stored in the cache line 114 will then be transmitted. And the cache line portion to be stored in the cache line 116 will follow.

In step 406, the one or more cache line data portions are sequentially transmitted from the system bus 108 to the bus controller 106 in a similar manner.

In step 408, the one or more cache line data portions are sequentially transmitted from the bus controller 106 to the cache 104.

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

What is claimed is:

1. A computer system, comprising:
   a processor issuing a data request for streaming data, the streaming data having two or more streaming data portions;
   a system memory in communication with the processor, the system memory having a specific area for storing the streaming data;
   a cache coupled to the processor, the cache having a predefined area locked for the streaming data; and
   a cache controller coupled to the cache and in communication with both the processor and the system memory, the cache controller being able to:
   divide the streaming data into two or more data portions;

determine a predefined area of the cache to store the two or more streaming data portions from the specific area of the system memory when the at least one of the two or more streaming data portions is not found in the predefined area of the cache;

store a first streaming data portion in the predefined area;

transmit the first streaming data portion from the cache to the processor before updating the locked portion of the cache; and in response to issuing a second data request for non-streaming data before the second streaming data portion is transmitted to the locked portion, optionally transmit non-streaming data from the system memory to a second portion of the cache before updating the locked portion with the next streaming data portion.

2. The computer system of claim 1, further comprising:

a system bus coupled to the system memory for receiving each streaming data portion from the system memory; and a bus controller coupled to both the cache and the system bus for transmitting each streaming data portion from the system bus to the cache.

3. The computer system of claim 1, wherein the predefined area comprises one or more cache sets, and wherein each cache set includes a plurality of cache lines.

4. The computer system of claim 3, wherein at least one of the one or more small data portions is further divided into one or more cache line data portions, wherein the one or more cache line data portions are sequentially transmitted from the memory to the cache.

5. The computer system of claim 2, wherein the predefined area comprises one or more cache sets, and wherein each cache set includes a plurality of cache lines.

6. The computer system of claim 5, wherein at least one of the one or more streaming data portions is further divided into one or more cache line data portions, and wherein the one or more cache line data portions are sequentially transmitted from the memory to the cache.

7. The computer system of claim 2, further comprising a cache controller coupled to the cache.

8. The computer system of claim 7, wherein the data request is transmitted from the processor to the system memory through the cache controller, the bus controller and the system bus.

9. The computer system of claim 1, wherein the cache controller comprises:

a memory access control unit for determining whether the streaming data is stored in the cache when the processor issues the data request;

a least-recently-used (LRU) unit;

a lock control unit for determining the predefined area; and a replacement control unit coupled to the memory access control unit, the LRU unit, and the lock control unit, the replacement control unit controlling the cache such that the streaming data is only stored in the predefined area of the cache.

10. The computer system of claim 1, wherein the streaming data is not stored outside the predefined area of the cache.

11. The computer system of claim 1, wherein the predefined area is locked for the streaming data.

12. A method for efficiently processing data using a cache in a computer system having a processor and a system memory, the method comprising the steps of:

issuing at least one data request for data;

transmitting by a processor the data request to the system memory;

determining if the data is streaming data and, in response thereto, dividing the streaming data into two or more streaming data portions;

transmitting only a first streaming data portion from the system memory to a locked portion of the cache;

storing the first streaming data portion in the locked portion;

transmitting the first streaming data portion from the cache to the processor before updating the locked portion of the cache with another streaming data portion; and in response to issuing a second data request for non-streaming data before the next streaming data portion is transmitted to the locked portion, optionally transmitting the non-streaming data from the system memory to a second portion of the cache before updating the locked portion with the next streaming data portion.

13. The method of claim 12, further comprising the step of determining whether all streaming data portions have been transmitted to the cache.

14. The method of claim 13, further comprising the step of:

upon determining that all streaming data portions have not been transmitted to the cache, updating the cache with another streaming data portion in the predefined area of the cache.

15. The method of claim 12, wherein the data includes streaming data.

16. The method of claim 12, wherein at least one of the one or more streaming data portions is further divided into one or more cache line data portions, and wherein the one or more cache line data portions are sequentially transmitted from the memory to the cache.

17. The method of claim 12, further comprising the step of locking the predefined area of the cache for the data.

18. A computer program product for efficiently processing data using a cache in a computer system having a processor and a system memory, the computer program product having a medium with a computer program embodied thereon, the computer program comprising:

computer code for issuing at least one data request for data;

computer code for transmitting by a processor the data request to the system memory;

computer code for determining if the data is streaming data and, in response thereto, dividing the streaming data into two or more streaming data portions;

computer code for transmitting only a first streaming data portion from the system memory to a locked portion of the cache;

computer code for storing the first streaming data portion in the locked portion;

computer code for transmitting the first streaming data portion from the cache to the processor before updating the locked portion of the cache with another streaming data portion; and in response to issuing a second data request for non-streaming data before the next streaming data portion is transmitted to the locked portion, computer code for optionally transmitting the non-streaming data from the system memory to a second portion of the cache before updating the locked portion with the next streaming data portion.

19. The computer program product of claim 18, further comprising computer program code for determining whether all streaming data portions have been transmitted to the cache.

20. The computer program product of claim 19, further comprising computer program code for, upon determining that all streaming data portions have not been transmitted to the cache, updating the cache with another streaming data portion in the predefined area of the cache.

21. The computer program product of claim 18, wherein the data includes streaming data.

22. The computer program product of claim 18, wherein at least one of the one or more streaming data portions is further divided into one or more cache line data portions, and wherein the one or more cache line data portions are sequentially transmitted from the memory to the cache.

23. The computer program product of claim 18, the computer program further comprising computer program code for locking the predefined area of the cache for the data.

* * * * *